Sept. 6, 1966  A. V. LA ROCCA  3,270,498
CONTROLLABLE VAPORIZING GAS ACCELERATOR
Filed Nov. 5, 1963  2 Sheets-Sheet 1

INVENTOR.
ALDO V. La ROCCA
BY Henry W. Kaufmann

AGENT

Sept. 6, 1966  A. V. LA ROCCA  3,270,498
CONTROLLABLE VAPORIZING GAS ACCELERATOR
Filed Nov. 5, 1963  2 Sheets-Sheet 2

INVENTOR.
ALDO V. La ROCCA
BY Henry W. Kaufmann
AGENT

United States Patent Office 3,270,498
Patented Sept. 6, 1966

3,270,498
CONTROLLABLE VAPORIZING GAS
ACCELERATOR
Aldo V. La Rocca, Villanova, Pa., assignor to General
Electric Company, a corporation of New York
Filed Nov. 5, 1963, Ser. No. 321,540
3 Claims. (Cl. 60—35.5)

This invention pertains to devices for producing controllable thrust by the electrical acceleration of gases, and more particularly to improved ways of controlling the magnitude of the thrust developed by such devices.

It is known in the art to impart momentum to a quantity of ionizable gas or vapor by ionizing it to cause it to become electrically conductive and then applying electrical energy to it so that thermal expansion and electromagnetic forces cause it to be accelerated out of a chamber, preferably through a suitable nozzle, with high velocity. One of the proposed applications of devices performing this function is to produce thrust to accelerate or orient a vehicle travelling in space, where the effective absence of ambient atmosphere renders the employment of conventional aerodynamic devices such as propellers and airfoils ineffective. Such application creates several important requirements.

The first of these requirements is for accurate control of the impulse applied, that is, control of the force and its duration. The long trajectories involved in space travel necessitate the most accurate possible adjustment of vehicle velocity and direction to achieve a desired path which will terminate at a desired point, to minimize the consumption of mass and of energy in interim adjustments of course. Stabilization of vehicle attitude also requires extremely accurate control of opposing noncollinear thrusts to apply torques which will impart the angular velocities needed to rotate the vehicle to the desired orientation, and will then reduce such angular velocities to zero when the desired orientation has been achieved.

The second requirement is the practical one that the consumption of the irreplaceable mass of the gas ejected be minimized. To this end, it is desirable that only so much gas be released from the store as is required to produce the desired impulse. To achieve this, it is not permissible to maintain a continuous leakage of gas into space, applying electrical energy only when thrust is desired. Schemes have been proposed for the employment of valves to permit the flow of gas only when it is required. However, the high reliability required in space vehicles favors the elimination of mechanical moving elements whenever possible.

A third consideration is that storage of gas in the gaseous state requires containers which are heavy either because of their volume, if storage is at low pressure, or because strength requires thick walls for storage at high pressure. The use of a solid fuel which becomes gaseous upon use is advantageous for this reason.

I have invented a thrust device in which an ionizable material is provided in an initially solid or liquid state, and is caused to become gaseous in amounts controlled in accordance with the amount of thrust required. This gas is accelerated by fluid dynamic and/or electrical means and is discharged to produce thrust. In one embodiment of my invention I achieve this by feeding a suspension of a metal such as cesium or lithium through a porous electrically insulating plug to provide a surface coating of the metal; I then cause the metal to be vaporized by an electrical discharge whose intensity and duration determine the amount of metal vaporized, and apply electrical energy to the metal vapors, discharging the accelerated vapors to produce thrust. Continuing diffusion of the suspension through the porous plug will maintain a supply of metal at the plug face as required by the consumption of the material. Since a successive electrical discharge can occur only through the vapor, control of the supply of vapor or gas by control of the vaporizing means will effectively control the application of electrical energy, for acceleration purposes. While vaporization by electrical means is obviously convenient because it is readily controlled, there may be many applications in which a more direct process of vaporization by direct application of heat may be preferable. It is also possible to design the electrical discharge portion of the system in such a fashion that, once a discharge has been initiated, the energy from this will be fed back to continue vaporizing the metal and thus continue the discharge.

It thus appears that I achieve by my invention numerous desirable objects, among which are:

Accurate and simple control of thrust and impulse of a gas jet;

Minimization of the consumption of mass in the production of controllable impulse;

Utilization, as a gas, of a material capable of being stored as a liquid or a solid at normal temperature, for thrust production;

Control of thrust and impulses of a gas jet by controlling the vaporization of a non-gaseous working substance, and the amounts of energy added to it;

Automatic feeding, without the use of mechanical valves, of the working substance required by a controllable gas-thrust device;

Variable exhaust velocities obtained by selectively changing the energy addition per unit mass of generated gas.

My invention achieves other objects which will be apparent to those skilled in the art, from the following specification and description.

For the better understanding of my invention I have provided figures of drawing, in which FIG. 1 presents partly in section and only schematically an expansion nozzle provided with a set of parallel bar electrodes such as may be employed in one class of embodiments of my invention;

Figure 1:
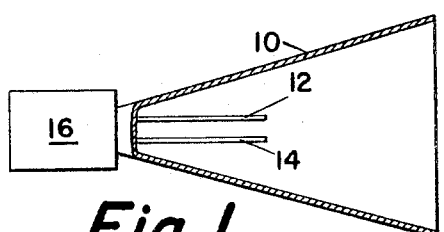

In FIG. 1, 10 represents in section an expansion nozzle, here shown as conical in shape, although its actual form may be modified depending upon the exact laws governing the movement of the expanding and accelerated gas. Electrodes 12 and 14, represented simply as parallel rods, are so-called rails which are suited to add energy to a moving ionized cloud of gas by virtue of the fact that the discharge between the rails 12 and 14 is subject to movement not only by thermal expansion of the gas in which the discharge occurs but also by reason of the electromagnetic interaction between the current in the discharge and the magnetic field produced by that same current flowing through the rails. It may be observed that in this representation the cone or nozzle 10, although represented by section lining as being of metal, need in fact not be electrically conducting, metal being useful in this application simply for its mechanical properties and for the possible need of shielding radio noise generated by the discharge. There is further represented in this figure a dashed rectangle 16 representative of the various embodiments of my invention which are suited for application to parallel electrodes such as 12 and 14 and are here represented by the embodiments of FIGS. 2, 3, and 4.

Figure 2:
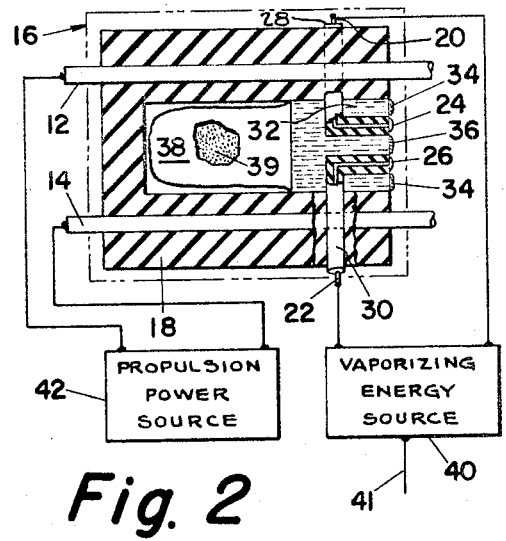
FIG. 2 represents an embodiment of my invention in which the vaporizing discharge takes place between two independent electrodes.

FIG. 2 represents in section a particular embodiment of the subject matter represented by rectangle 16 of FIG. 1. Rails or electrodes 12 and 14 are represented as partially embodied in a block or housing 18 of insulating material required to have the properties of high dielectric strength and ability to endure without deterioration the effects of the ionizing electrical discharges which occur, inter alia, between electrodes 12 and 14. Passing through the body of housing 18 are vaporizing or trigger electrodes 20 and 22. These terminate in discharge electrodes represented at points 24 and 26 and are housed in separate insulating sleeves 28 and 30. It will be observed that in the figure, electrode 22 and insulation 30 are completely exposed while electrode 20 and insulation 28 are partly below the surface of housing 18 in the section shown. This section is drawn in the plane through the centers of electrodes 12 and 14. It is therefore evident that electrodes 22 and 20 lie in planes which are oblique to the plane through the centers of electrodes 12 and 14, while discharge portions 24 and 26 are in the same plane with 12 and 14. The discharge portions 24 and 26 of electrodes 20 and 22 lie at the face of a porous plug 32 which may conveniently be a ceramic of suitable porosity. It is represented in section by parallel lines creating the impression of a number of passages extending from left to right in the figure. Since it is the existence of passages in this direction which is required of the porosity of porous block 32, this representation is believed a suitable one in the absence of any standard representation for porous ceramics. The pores of block 32 are filled with a suspension or other fluid substance which includes either elementally or in chemical combination (or both) a material readily vaporized and readily ionized. For the embodiment shown, this suspension may conveniently be one of powdered lithium or cesium in a low vapor pressure oil such as those which are employed in oil diffusion vacuum pumps. At the right hand end surface of block 32, the exudation of the suspension produces surface deposits of material containing metallic lithium or cesium represented in the figure by the reference numbers 34 and 36. For limited applications, the porous block 32 may contain in its porosities a sufficient store of the non-gaseous ionizable or working material. However, in order to represent an embodiment which does not depend upon the amount of working material that can be stored in the porosities of block 32, I have further represented an elastic bladder or flexible thimble 38, which may be under pressure from its own elasticity or some externally applied force (as by a conventional spring) or pressurizing gas or saturated vapor, or may contain wicks 39 to convey its contents by surface effects, which is so connected to block 32 that any material in bladder 38 will tend to be discharged into the left-hand side of block 32 to replenish material such as 34 and 36, which has issued from the right-hand side. The use of pressure from bladder 38 facilitates the use of pasty material, such as amalgams. There is represented as connected to electrodes 20 and 22 a vaporizing energy source 40 schematically represented by a rectangle and controllable by signals applied to lead 41; and connected to electrodes 12 and 14 a propulsion power source 42 similarly represented. It is essential to the functioning of this embodiment that an electrical discharge take place between electrodes 24 and 26 liberating ionized vapors from the store in material 36; and that, while this ionizable mass of material exists in vapor form between electrodes 12 and 14, there shall occur between them a potential difference high enough to cause an ionizing discharge or arc through the mass of vapor, causing it to be propelled to the right of the figure and adding, to the mass of vapor, energy from the electrical discharge. The vapor so discharged, as is evident from the figure, will be expanded through nozzle 10 and discharged into the surroundings, thereby effecting a discharge of momentum to the right of FIG. 1 and leaving the system represented with momentum, or thrust reaction, directed to the left of the figure. The times during which sources 40 and 42 are caused to provide potentials to their respective electrode systems and the values of such potentials may be varied in a number of ways. Since one of my objectives is to provide exact control of thrust, it is preferred that source 40 be constructed as a pulse generator which, when triggered in some suitable fashion, will produce a pulse of energy in a discharge between electrodes 24 and 26 and thereby vaporize from coating 36 a predictable mass of ionizable material. In preferred embodiments of my invention, propulsion power source 42 will not be adjusted directly to control thrust but will be set to produce an arc of given intensity when ionizing material is provided between electrodes 12 and 14. Assuming a uniform application of energy from source 42 and a uniform mass of material, the total quantity of energy added to each such mass of the material in its passage down rails 12 and 14 should be uniform, and thus a pulse produced from vaporizing energy source 40 should generate a fixed amount of momentum. This amount of momentum is preferably quite small so that an adjustment in the velocity of a vehicle of any appreciable size may be effected with a high degree of precision by applying a large number of triggering impulses to source 40 so that the desired total of a large number of small increments of momentum may be produced.

It is evident that propulsion power source 42 may consist simply of a direct current source which supplies current according to the magnitude of the ionized conducting path between electrodes 12 and 14. Such a design is likely to be uneconomical if the duty cycle of the device is low. For low duty cycles, it is much more economical to charge a capacitor through a suitable resistance or impedance from a D.C. source whose output current is appreciably smaller than the current which is to be passed through discharges between the rail electrodes 12 and 14. When such a discharge actually occurs, the energy which has been stored in such a capacitor (or delay line) over a long period of time will be discharged in a much shorter period. Alternatively, it would be permissible to keep propulsion power source 42 turned off normally and turn it on only as a pulse was supplied by source 40 to electrodes 24 and 26. This possibility is mentioned simply to show that a wide variety of modes of applying and removing potential to the electrodes will function. However, the generally preferred mode of operation is one in which the expense of providing switching devices for switching source 42 on and off rapidly is eliminated and reliance is placed on the triggering of source 40 to give control of the discharge.

It will be observed that electrodes 24 and 26 not only are separated by material represented at 36 but that some of the same potential working substance lies apparently behind them at points 34. Since the material represented by 34 and 36 may well be electrically conducting, the discharge may occur anywhere around electrodes 24 and 26 and not necessarily in a direct line between them. It is possible, by shaping porous plug 32 so that faces 34 and 36 actually protrude into the discharge path between rails 12 and 14 to cause the main discharge to produce additional working substance. In such an application, it is necessary that propulsion power source 42 be so designed that it will limit the duration of its own discharge, since otherwise it would continue indefinitely producing its own gas and forming a continuous arc.

Although it has been mentioned that the working substance to be vaporized may be a suspension of finely divided metal such as lithium, or cesium, it must of course be recognized that there are also usable liquid metals, such as mercury, and many compounds which can be decomposed chemically by an electrical discharge with the release of an ionizable material. Many of the coatings used in the vacuum tube art to produce cathodes, and in particular, materials used in stroboscope lamps, show this property in high degree.

Figure 3:
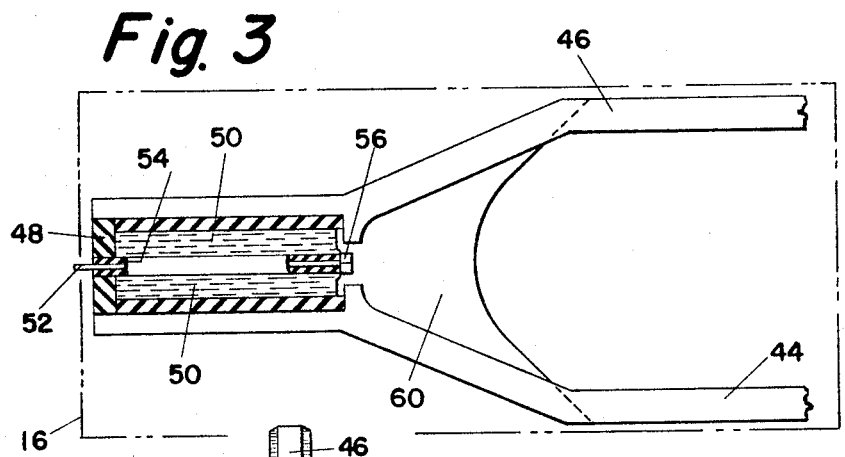
FIG. 3 represents a somewhat more sophisticated construction of the same generic type of embodiment as does FIG. 2.
Figure 4:
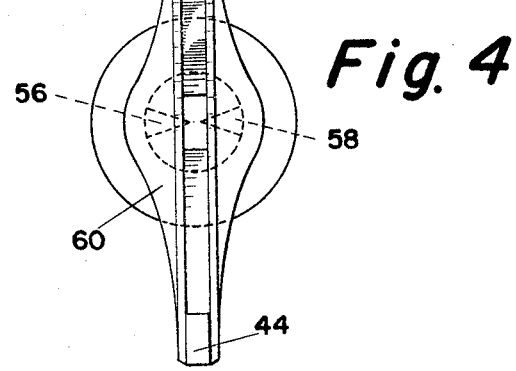
FIG. 4 is a profile view of the embodiment represented in FIG. 3.

FIGS. 3 and 4 represent another embodiment of my invention employing parallel propulsion electrodes or rails, FIG. 4 being a profile view of FIG. 3. Rails 44 and 46 are separated and supported by insulating housing 48. A porous plug 50 is located in housing 48, and is pierced by two triggering or vaporizing electrodes of which only 52 is visible, insulated by sleeve 54. Electrode 52 terminates in discharge point 56, and its mate terminates in discharge point 58, the two being opposed to form a gap lying at right angles to the gap between rails 44 and 46. Vaporizable material is provided from the porosities of porous plug 50, as in the embodiment represented in FIG. 2. A distinctive feature of the present embodiment is the nonconductive baffle or nozzle 60 (which may be surrounded by an external conductive shield) which surrounds the gaps mentioned and extends for a short distance along the rails, forming a chamber in which the ionized vapor arc is formed and from which it is expanded into the space between the rails. The rails 44 and 46, in the present embodiment, are provided with extensions toward each other at the location of discharge points 56 and 58, so that the initial arc formation occurs at a gap smaller than that elsewhere existing between the rails; and these extensions form a chamber of particularly appropriate shape to form and direct the propellant charge. The connection of vaporizing energy source and propulsion power source in this embodiment corresponds completely with that shown in FIG. 2, and is therefore not repeated here. As the dashed lines indicate, the embodiment of FIG. 3 is a possible embodiment of 16 of FIG. 1.

Figure 5:
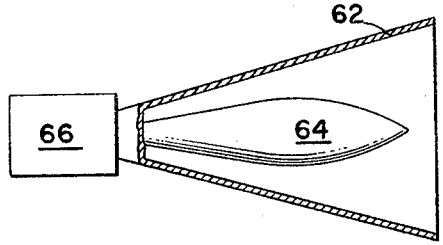
FIG. 5 represents partly in section and only schematically an expansion nozzle in which the nozzle itself forms one of the concentric discharge electrodes, of a generic type suitable for embodiments of my invention.

FIG. 5 represents, partly in section, a basic concentric electrode arrangement differing from that of FIG. 1 in that the nozzle 62 serves as one electrode of the propulsion electrode system, electrode 64 being the other required electrode, 64 and 62 being concentric. The rectangle 66 represents the various embodiments of my invention which are adaptable to such a concentric electrode system. In FIG. 5, nozzle 62 must be electrically conductive because it serves as an electrode. The remarks concerning possible variations in the exact shape of nozzle 10 apply equally to nozzle 62 and electrode 64.

The feeding system can be adapted to all kinds of configurations, from the two-dimensional (rail accelerators) to the axis symmetrical. The basic difference can be found in the fact that these later require a central electrode for the main discharge. The shape of this central electrode can vary from that of a coaxial cylinder of equal or comparable length, for the case of cylindrical external electrodes, to those of shorter, to the limit button-like, contoured bodies for the case of diverging or converging external bodies.

Figure 6:
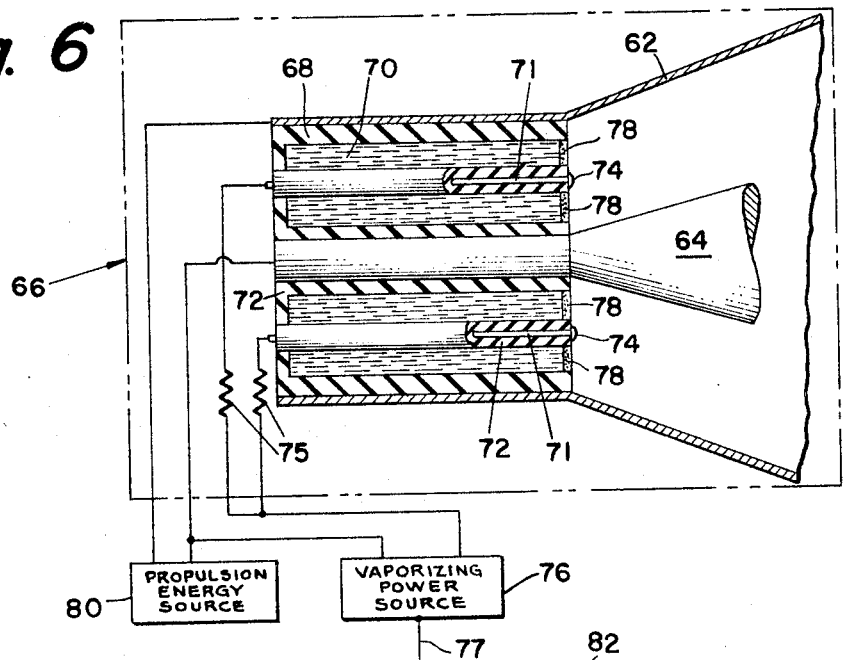
FIG. 6 represents partly in section and schematically an embodiment of my invention employing the concentric structure generically represented in FIG. 5 and representing a category of embodiment in which the ionizing discharge occurs between independent ionizing electrodes and one of the propulsion electrodes.

FIG. 6 represents an embodiment of my invention suitable for use as reference item 66 of FIG. 5. Electrodes 62 and 64 are supported and separated by insulating housing 68. A porous plug 70 is located concentrically between electrodes 62 and 64, insulated from both of these by housing 68. A plurality of electrodes 71, insulated by insulating sleeves 72, terminates in discharge points 74. Triggering or vaporizing electrodes 71 are connected through stabilizing resistors 75 to each other and to one terminal of vaporizing energy source 76, whose other terminal is connected to electrode 64, as represented. Source 76 is controllable by signals applied via conductor 77. Application of a vaporizing pulse from vaporizing energy source 76 will cause a discharge to occur between discharge points 74 and electrode 64, across the deposits 78 of vaporizable material at the face of porous plug 70, which is charged with a suspension of vaporizable material, as was described in connection with FIG. 2. A mass of ionized vapor being thus produced in the vicinity of electrode 64, propulsion power source 80 causes an arc to be formed between electrodes 62 and 64 through the mass of vapor, which is accelerated, directed and expanded through the space between the electrodes 62 and 64, as generally represented further in FIG. 5.

It is, of course, possible to make connections to produce a discharge between discharge points 74 and electrodes 62, rather than 64; or to apply the vaporizing pulse between various ones of electrodes 71 instead of connecting them together. The basic objective to be attained is to produce a centrally symmetrical mass of gas. This may be achieved in a number of ways. Alternate ones of electrodes 71 may be connected together, preferably through stabilizing resistors such as 75, forming two groups of electrodes which may be connected to two terminals of the vaporizing energy source. Such an arrangement will produce a ring-shaped discharge, which will be symmetrical around the center. All of these will, of course, partake of the advantage of my invention that it produces gas as a working substance by a process which also ionizes it ready to conduct the arc between the main or propulsion electrodes. I have simply selected the concentric electrode structure of FIG. 5 for illustrating the particular embodiment in which the ionizing discharge is caused to occur between the vaporizing electrodes and one of the main propulsion electrodes. This same principle can, obviously, be applied to the parallel rail arrangement.

Figure 7:
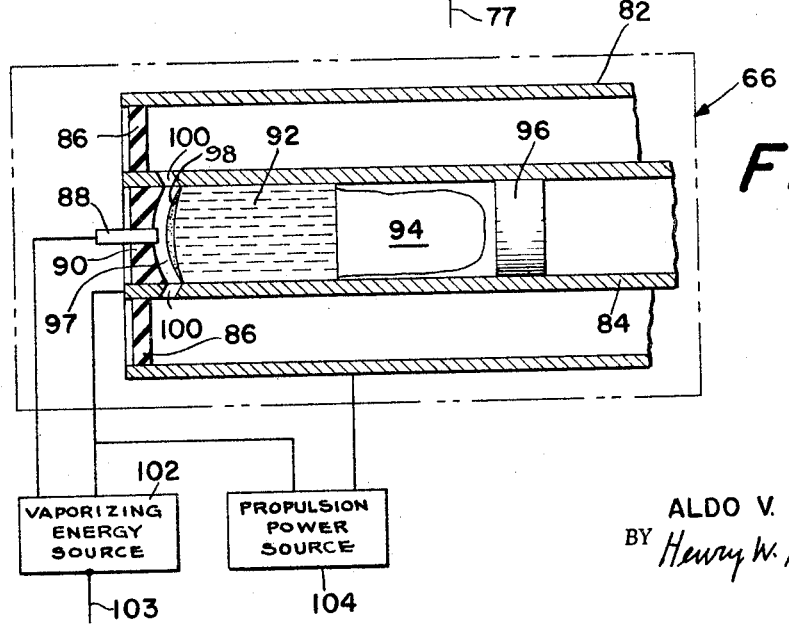
FIG. 7 represents in section a concentric electrode structure in which the vaporizing discharge is caused to occur between a vaporizing electrode and the interior of the inner of two concentric propulsion electrodes, to produce a flow of vapor into the main discharge space.

FIG. 7 represents an embodiment of my invention suitable for a specific exemplification of the structure represented generally in FIG. 5 as item 66. In this instance, electrodes 82 and 84, corresponding to 62 and 64 of FIG. 5, are separated and spaced from each other by an insulating ring 86. Central electrode 84 is hollow. A single vaporizing or triggering electrode 88 is located centrally in electrode 84 by insulating piece 90. Opposed centrally to electrode 88 is porous plug 92, which is not insulated from electrode 84. A flexible bladder 94 is represented as a source of additional working substance, connected to porous plug 92 in similar fashion to that represented in FIG. 2. Electrode 84 is blocked off internally beyond bladder 94 by plug 96. In like manner as has been previously described, porous plug 92 (and bladder 94) contain a suspension of working substance which appears as a coating 98 at the face of plug 92. The small chamber 97 formed by coating 98 (or the face of plug 92), the face of insulating piece 90, and the walls of electrode 84 is vented by a port or ports 100 leading from the said chamber to the space intermediate between electrodes 82 and 84. As is indicated by FIG. 7, the vaporizing energy source 102 is connected between electrode 88 and electrode 84. Source 102 is controllable by signals applied to conductor 103. A pulse of energy from vaporizing energy source 102 will impinge directly upon coating 98, producing ionized vapor which, because of both thermal and electromagnetic forces, will discharge through ports 100. Propulsion power source 104 will then provide energy to form an arc between electrodes 82 and 84, which will cause the mass of gas or vapor to move out through the space between electrodes 82 and 84 which correspond exactly to electrodes 62 and 64 of FIG. 5.

It is apparent from consideration of the variety of embodiments of my invention which I have disclosed that it is a basic concept capable of a number of variations to meet requirements peculiar to various applications. Also, to avoid undue multiplication of figures, I have not illustrated all possible combinations and permutations by which those skilled in the art can apply particular embodiments. Thus, while it may be generally stated that the embodiments shown are those which I prefer for the particular applications indicated generically by FIGS. 1 and 5, it must be recognized that specific requirements of a particular application may well render other embodiments of my invention preferable to meet those specific requirements.

The appended claims are drafted in subparagraph form in compliance with the request of the Commissioner of Patents, to facilitate reading and understanding. The particular division into subparagraphs is therefore for this purpose alone, and is not necessarily indicative of relative importance of the elements recited, nor of any physical division or relation of such elements.

What is claimed is:

1. A device for producing thrust by the electrical acceleration of gas, comprising:
   a store of non-gaseous material capable of being altered by electrical discharge at least partly to an ionizable gas;
   a member having a porous surface connected with the said store to receive a coating of the said non-gaseous material;
   vaporizing electrode means disposed in proximity to the said porous surface for controlled production of electrical discharges to controllably convert the said coating of non-gaseous material into an ionizable gas;
   propulsion electrode means for producing an electrical discharge through the said ionizable gas for addition of energy thereto;
   nozzle means for directing the said gas, to discharge the said gas to produce a thrust reaction.

2. A device as claimed in claim 1, wherein
   the said non-gaseous material is an alkali metal suspended in a liquid;
   the said member having a porous surface is a porous plug;
   the said propulsion electrode means are more remote from the said porous surface than are the said vaporizing electrode means.

3. Controllable gas thrust apparatus comprising:
   gas electrical acceleration means comprising:
      non-gaseous material capable of being altered by electrical discharge at least partly to an ionized gas;
      vaporizing electrode means for production of electrical discharges to convert the said non-gaseous material into an ionized gas;
      a controllable vaporizing energy source connected to the said vaporizing electrode means to controllably produce the said electrical discharges;
      propulsion electrode means for addition of energy to the said ionizable gas to accelerate it;
      a propulsion power source connected to the said propulsion electrode means.

References Cited by the Examiner

UNITED STATES PATENTS

| | | |
|---|---|---|
| 2,754,442 | 7/1956 | Boutey et al. |
| 2,961,559 | 11/1960 | Marshall. |
| 3,073,984 | 1/1963 | Eschenbach et al. |
| 3,122,882 | 3/1964 | Schultz et al. _____ 60—35.5 |
| 3,149,459 | 9/1964 | Ulam _____ 60—35.5 |
| 3,191,077 | 6/1965 | Marks et al. _____ 313—63 X |
| 3,191,092 | 6/1965 | Baker et al. _____ 60—35.5 X |

OTHER REFERENCES

Penner, S. S.: Advanced Propulsion Techniques, N.Y., Pergamon, 1961, pp. 124, 125, 210.

MARK NEWMAN, *Primary Examiner.*

CARLTON R. CROYLE, *Examiner.*